July 13, 1965  J. BURTON ETAL  3,195,079
BUILT UP NONMETALLIC WAVE GUIDE HAVING METALLIC COATING
EXTENDING INTO CORNER JOINT AND METHOD OF MAKING SAME
Filed Oct. 7, 1963
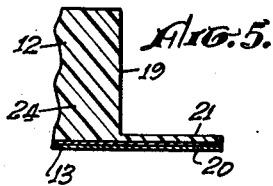
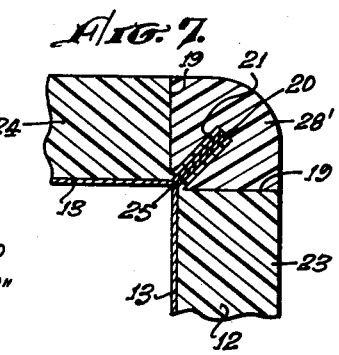
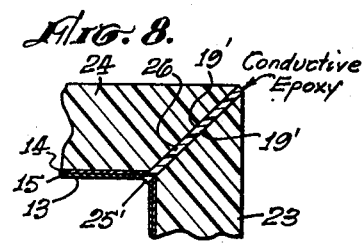
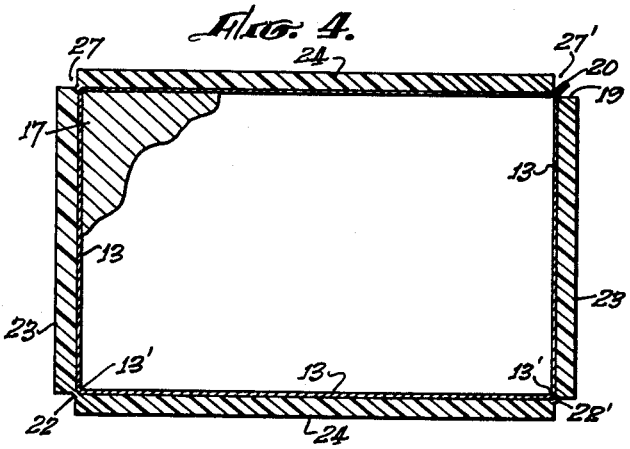
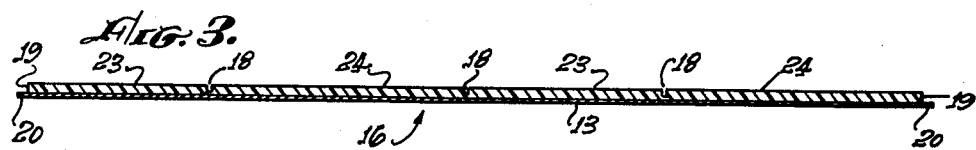
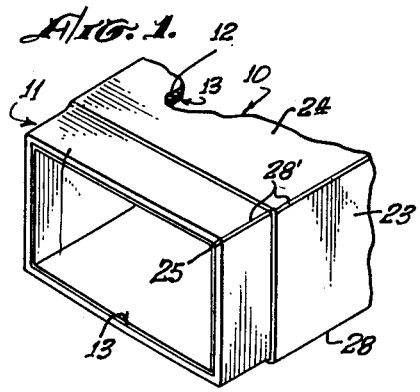
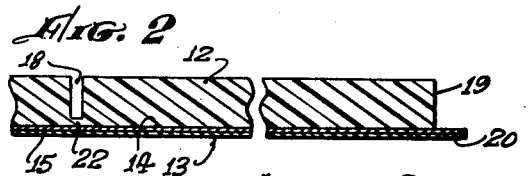
JERRY BURTON,
JOSEPH BURTON,
PAUL GINDER,
INVENTORS.
BY
Lynn H. Latta
ATTORNEY.

United States Patent Office 3,195,079
Patented July 13, 1965

3,195,079
BUILT UP NONMETALLIC WAVE GUIDE HAVING METALLIC COATING EXTENDING INTO CORNER JOINT AND METHOD OF MAKING SAME
Jerry Burton, Los Angeles, Joseph Burton, Sherman Oaks, and Paul Ginder, Lakewood, Calif., assignors to Burton Silverplating, Culver City, Calif., a corporation of California
Filed Oct. 7, 1963, Ser. No. 314,425
4 Claims. (Cl. 333—95)

This invention relates to tubular electrical conductors for high frequency circuits, commonly known as wave guides. More specifically, the invention deals with the fabrication of wave guides of composite structure embodying thin metallic surfaces on the interior of a tubular body of plastic material.

In the prior art, wave guides were originally fabricated of solid rectangular section metal tubing. Following the development of printed circuits of copper and silverplating, first on phenolic thermosetting sheet material and later on epoxy-fiberglass sheet material, wave guides have been developed embodying tubular body structures of plastic material, and with metallic interior surfaces deposited by copperplating, followed by silverplating. In order to obtain adequate bonding between the copper undercoating and the plastic tube body (e.g. of epoxy-fiberglass material) the plastic surfaces were first roughened. The roughness of the plastic surface was reproduced in the plated coatings, and accordingly, such wave guides have proved to be of reduced efficiency in the transmission of high frequency signals, below that of solid metal wave guide tubing.

The general object of the present invention is to improve the transmission efficiency of this composite type of wave guide. The invention embraces the following specific objects:

(1) To provide a wave guide of composite plastic tubing having a thin metal coating on its internal surfaces, the coating having a high degree of smoothness.

(2) To provide a superior wave guide of lightweight construction, largely of plastic material, with an extremely smooth internal metallic surface of high transmission efficiency.

(3) To provide an improved method of fabricating such a superior wave guide at relatively low cost.

(4) To provide an improved method of fabricating such a composite wave guide, in which the metallic internal surface is of laminate construction including an underlayer of extremely smooth copper foil and a surface layer of plated noble metal which reproduces the smooth surface of the underlayer.

(5) To provide an improved method of fabricating a composite metal coated plastic wave guide eliminating the step of internal plating of a preformed plastic tube structure.

Other objects and advantages will become apparent in the ensuing specification and appended drawing in which:

FIG. 1 is a perspective view of a wave guide embodying our invention;

FIG. 2 is a fragmentary cross-sectional view on an enlarged scale, of a portion of the wave guide in an intermediate stage of fabrication;

FIG. 3 is a cross-sectional view of the blank from which the wave guide is fabricated;

FIG. 4 is a cross-sectional view of the wave guide in a more advanced stage of fabrication;

FIG. 5 is a fragmentary cross-sectional view on an enlarged scale, illustrating a step utilized in fabricating the corner joint of FIG. 7;

FIG. 6 is a fragmentary cross-sectional view on an enlarged scale, of one corner of the wave guide in a further advanced stage of fabrication;

FIG. 7 is a fragmentary cross-sectional view on an enlarged scale, of another corner of the wave guide, illustrating the joining of adjacent side wall members to form said corner;

FIG. 8 is a fragmentary cross-sectional view of a modified form of corner joint; and FIG. 9 is a fragmentary cross-sectional view of a wave guide embodying another modified form of joint.

Referring now to the drawing in detail, and in particular to FIG. 1, I have shown therein, as an example of one form in which the invention may be embodied, an end portion of a wave guide comprising a tubular body portion 10 having, at its end, a projecting neck 11 of reduced thickness, for reception in a coupling flange or the like. The wall structure of both the tubular body 10 and neck 11 is of laminate construction including an outer relatively thick wall member 12 of a suitable plastic material such as epoxy resin impregnated fiberglass sheet; and an internal metallic lining 13 having an extremely smooth surface for maximum efficiency of transmission.

Referring now to FIG. 2, the metallic lining 13 is of laminate structure, comprising an under layer 14 of copper foil and a bright-plated surface layer 15 of silver plating. Both layers are attached to a flat sheet of the plastic material 12 prior to fabricating the tubular structure of the wave guide, the copper foil layer 14 being bonded by heat and pressure to the plastic sheet 12. The surface of sheet 12 to which the foil is bonded is in itself provided with a smooth flat finish prior to the application of the copper foil thereto. A suitable bonding cement is preferably applied in a thin coating to the surface of plastic sheet 12 prior to application of the foil layer 14, and bonding is consumated by the application of heat and pressure. Pressure is applied in a manner such as to leave the foil layer 14 in a flat smooth condition, preferably by utilizing a smooth flat platen with a suitable heating element therein, to simultaneously apply both the pressure and heat.

After the foil layer 14 has been securely attached to the epoxy sheet 12, it is smoothed by a polishing or burnishing operation so as to provide it with a highly polished, perfectly smooth flat outer surface. This outer surface is then silverplated to provide the conductive surface coating 15.

Referring now to FIG. 3, the prefabricated, metal coated sheet is cut to the proper width to provide a blank 16 embodying the four sides of a rectangular wave guide, the sheet is then milled to provide in the plastic body 12, on the side opposite from the conductive coating 13, three grooves 18 extending parallel to the side margins of the blank 16, and the side marginal portions of plastic body 12 and are then milled away to provide recessed side margins 19 and projecting lips 20 (FIG. 5) faced by the thin metal coating 13 which may be backed by thin layers 21 (in the range of .002"–.005" thickness) of the plastic body 12 left at the extremity of the milling cut. The grooves 18 may be narrow kerfs, approximately as indicated in FIG. 2, and are milled to a depth at least 90 percent through the thickness of the plastic sheet 12. For example, if the wall thickness of sheet 12 is 1/16 inch, the grooves 21 are preferably milled to a depth such as to leave a thin web 22 of plastic material having a thickness in the range of .003 inch, or less. The thickness of layer 21 and of web 22 is in each instance comparable to the combined thicknesses of metal layers 14 and 15, which likewise may be in the range of several thousandths of an inch.

Defined between the grooves 18 and the side margins of the blank are respective side panels 23 and 24. FIG. 4 illustrates the next stage of fabrication, in which the panels 23 and 24 are bent at right angles to one another to provide the sides of a rectangular tube having four corners developed by bending the webs 22 through 90°, the bent webs being indicated at 22' in FIG. 4. These bent webs are reinforced by corner bends 13' in the lining 13. Thus three of the corners of the tube are developed in an initial stage. The side marginal lips 20 are brought together to form the fourth corner in an initial stage of development.

FIG. 7 illustrates the completion of this fourth corner, in which lips 20 have been bent 45° toward side margins 19 and are brought together with their metal facings in contact to provide a closed internal corner 25 having a continuous metallic surface, free of any gap therein (which would reduce the transmission efficiency of the wave guide).

In bending the blank 16 into the tubular form, it is preferably bent around a suitably shaped mandrel 17 (FIG. 4) and the four panels 23, 24 are suitably clamped to the four sides of the mandrel to hold the blank in the closed tubular form until the corners are reinforced and secured.

The corners of the wave guide, which have longitudinally extending recesses 27, 27' in the partially completed stage shown in FIG. 4, are then reinforced (FIG. 6) by filling them with strips of epoxy resin 28, 28' (FIGS. 6 and 7) which become bonded to the milled margins 18' and 19 of wall panels 23 and 24 and to the thin backing layers 21 and webs 22, so as to build up the corner thickness to approximately equal the thickness of panels 23 and 24. This can be satisfactorily accomplished by depositing strips of epoxy resin in a plastic or semi-liquid state and then permitting it to cure to a hard, solid condition. The strip 28' which is deposited in the corner space 27' becomes a securing channel (FIG. 7) which secures the lips 20 permanently in contact with one another to provide the closed corner 25.

FIG. 8 illustrates an alternative method of joining beveled margins 19' at the respective sides of the blank, in a manner to provide a continuous metallic surface in the internal corner 25'. This alternative method includes the milling of 45° beveled margins 19' on the respective side margins of the blank. In the completion of this fourth corner, a film of conductive epoxy resin 26 is interposed between the beveled margins 19' and utilized to bond these margins together. The inner edge of the film 26 constitutes a metallic joint between the adjacent edges of the metallic coating 13, avoiding a gap therein which would tend to impair the high frequency conductivity of the device.

The reduced thickness neck 11 is fabricated by milling off a portion of the thickness of the plastic sheet structure 12 in the flat blank of FIG. 3, along one end margin of the blank (not shown), thus providing a thinned lip extending full width along this end margin. As the blank is folded into the rectangular tube form, the four sections of this flat end lip will be bent with respect to one another and brought together to form the neck 11.

FIG. 9 shows a further modified form of the invention wherein a joint is provided in one of the narrower sides 23' of the wave guide, in a manner generally similar to the corner joint disclosed in FIG. 7. In the wave guide of FIG. 9, all four internal corners of the guide are formed by integral bends 13' in the metal lining of the guide, and the construction at each of the four corners is in accordance with the disclosure in FIG. 6, although not shown in detail in FIG. 9. The free margins of the blank are formed in a side 23' fabricated by two marginal sections bent into a common plane, their marginal edges beveled at 19", with projecting metal-lined lips 20 of the construction shown in FIG. 5, the lips 20 being bent at right angles to the adjoining sections of lining 13 and brought together, projecting into a channel space of 90° dihedral angle, and this channel space then being filled with a strip of resin 28" which is hardened to provide a binder strip that is securely bonded to the beveled margins 19" and to the plastic backing layers of the lips 20 to securely join the sections of wall 23' in closed relation.

This modified form of wave guide has the advantage of uniformity in the four corners 13', and since the wider sides of the wave guide are of more importance than the narrower sides 23 in the transmission of signals, the presence of the joint in a narrower side 23 is of minimum consequence insofar as signal impairment is concerned.

We claim:

1. A method of fabricating a wave guide, including the following steps: preparing a sheet of non-metallic material with a flat face; applying to said flat face a metallic undercoating having a smooth exposed surface; bright-plating a surface coating of noble metal on said undercoating to provide an internal metal coating having a finish surface of a high degree of smoothness; providing in said sheet of non-metallic material a plurality of laterally spaced parallel grooves extending from the side thereof opposite said metallic coating to a depth closely adjacent said metallic coating so as to provide a plurality of side panels joined by thin webs including said metallic coating, bending said thin webs so as to position said panels in the form of a polyhedral tube with said webs as several corners thereof and with external corner recesses defined between the side faces of said grooves; bringing free side margins of the lateral panels into adjoining relation to form another corner of said tube; filling said corner recesses with non-metallic material bonded to said side faces of said grooves to reinforce the filled corners; joining said free margins to one another to constitute said other corner, whereby to form a corner joint; providing at the inner extremity of said corner joint a metallic joint integrally joining the coatings of said adjoined panels; said free side margins being defined by marginal faces normal to the side faces of the respective lateral panels and defining an external 90 degrees corner recess in said tube; and including the further steps of providing, at said other corner, extensions of said metallic coating beyond said marginal faces in the form of narrow marginal lips; bending said lips at acute dihedral angular relation to said marginal faces; bringing the bent lips together; providing a metallic bond between the exposed metallic faces of said lips; and filling said external corner recess with a strip of material of channel form binding said lips to one another and bonded to said marginal faces to reinforce said corner joint.

2. A method of fabricating a wave guide, including the following steps: preparing a sheet of non-metallic material with a flat face; applying to said flat face a metallic under coating having a smooth exposed surface; bright-plating a surface coating of noble metal on said undercoating to provide an internal metal coating having a finish surface of a high degree of smoothness; providing in said sheet of non-metallic material a plurality of laterally spaced parallel grooves extending from the side thereof opposite said metallic coating to a depth closely adjacent said metallic coating so as to provide a plurality of side panels joined by thin webs including said metallic coating, said grooves being relatively narrow and deep, with parallel, opposed side faces; bending said thin webs so as to position said panels in the form of a polyhedral tube with said webs as several corners thereof, whereby 90° dehedral angular corner recesses are opened in said several corners of said tube by said bending step; bringing free side margins of the outer panels into adjoining relation to form another corner of said tube; joining said free margins to one another to constitute said other corner by filling an external recess between said free side margins thereof with a material bonded to said free side margins to constitute a corner joint; providing at the inner extremity of said corner joint a metallic joint between the coatings of said adjoined panels and integrally joining said coatings thereby; filling said corner recesses with non-metallic material bonded to said side faces of said grooves to reinforce the filled corners; said free side margins being defined by marginal faces defining an external dihedral corner recess in said tube; and including the further steps of providing, at said other corner, extensions of said metallic coating beyond said marginal faces in the form of narrow marginal lips; bending said lips at acute dihedral angular relation to said marginal faces; bringing the bent lips together; providing a metallic joint between the exposed metallic faces of said lips; and filling said external corner recess with a strip of material of channel form binding said lips to one another and bonded to said marginal faces to reinforce said corner joint.

3. A wave guide in the form of a polyhedral tube formed of a single sheet bent at three corners of said tube so as to provide four panels each comprising a relatively thick external body of non-metallic material and a relatively thin internal facing of metal having a high degree of smoothness in its internal surface, said internal surface providing a plurality of internal conductive faces, and integral bends joining said conductive faces within said three corners of the tube; said body portions of adjacent panels having marginal faces diverging from the respective internal metallic corners in dihedral angular relation; strips of material filling the corner recesses defined between said marginal faces and bonded to the latter and reinforcing said three corners of the tube; and a fourth corner constituting a joint between adjacent side panels, said fourth corner comprising metallic lips constituted by extensions of said internal metal facing beyond adjacent marginal faces of the said adjacent side panels, said lips being bent outwardly and brought together and joined by a metallic joint extending to and merging with said internal facing of metal, and a strip of material of channel form embracing and securing said lips together and bonded to the adjacent marginal faces of the body portions of said adjacent panels to reinforce said fourth corner joint.

4. A wave guide as defined in claim 3, wherein said internal metallic facing consists of a single sheet of metal foil bonded to the inner faces of said body portions of their respective panels and extending continuously around said majority of corners; and a bright-plated noble metal internal facing on said sheet of metal foil.

References Cited by the Examiner

UNITED STATES PATENTS 2,381,367  8/49  Quayle _____ 333—95
2,998,475  8/61  Gumsinger _____ 174—68.5
3,119,540  1/64  Schenk _____ 229—30

FOREIGN PATENTS 1,117,682  11/61  Germany.
 696,900   9/53  Great Britain.

HERMAN KARL SAALBACH, *Primary Examiner.*